United States Patent [19]

Ladin

[11] Patent Number: 4,601,374
[45] Date of Patent: Jul. 22, 1986

[54] HYDRAULIC CLUTCH PISTON AND SEAL

[75] Inventor: Eli M. Ladin, Ann Arbor, Mich.

[73] Assignee: Federal-Mogul Corporation, Southfield, Mich.

[21] Appl. No.: 459,184

[22] Filed: Jan. 19, 1983

Related U.S. Application Data

[63] Continuation-in-part of Ser. No. 370,710, Apr. 22, 1982.

[51] Int. Cl.$^4$ .................. F16D 25/08; F16D 23/14
[52] U.S. Cl. ..................... 192/85 CA; 192/91 A; 192/98
[58] Field of Search ............... 192/85 CA, 91 A, 98; 92/107, 108, 109, 165 R; 210/532.1

[56] References Cited

U.S. PATENT DOCUMENTS

| | | |
|---|---|---|
| 556,704 | 3/1896 | Stevens . |
| 1,130,615 | 3/1915 | Laursen . |
| 1,464,653 | 8/1923 | Hallauer . |
| 1,613,066 | 1/1927 | Turner . |
| 1,746,765 | 2/1930 | Carhart . |
| 1,758,597 | 5/1930 | Ford . |
| 1,889,857 | 12/1932 | Gardner . |
| 1,981,262 | 11/1934 | Burt . |
| 1,994,244 | 3/1935 | Folberth et al. . |
| 1,999,366 | 4/1935 | Maybach . |
| 2,029,367 | 2/1936 | Geyer . |
| 2,057,744 | 10/1936 | Sanford . |
| 2,060,692 | 11/1936 | Rockwell . |
| 2,067,499 | 1/1937 | Millmine . |
| 2,068,579 | 1/1937 | Tatter . |
| 2,081,040 | 5/1937 | King . |
| 2,089,472 | 8/1937 | Geyer . |
| 2,135,617 | 11/1938 | Geyer . |
| 2,141,678 | 12/1938 | Andres . |
| 2,155,207 | 4/1939 | Stocker . |
| 2,211,191 | 8/1940 | Wolfram . |
| 2,268,733 | 1/1942 | Williams . |
| 2,352,812 | 7/1944 | Taylor, Jr. . |
| 2,362,242 | 11/1944 | Casler . |
| 2,387,182 | 10/1945 | Procter . |
| 2,400,585 | 5/1946 | Wolff . |
| 2,422,155 | 6/1947 | Wemp .................. 192/85 CA X |
| 2,501,005 | 3/1950 | Rockwell . |
| 2,502,798 | 4/1950 | Nabstedt et al. . |
| 2,525,220 | 10/1950 | Hague . |
| 2,541,452 | 2/1951 | Wemp .................. 192/85 CA X |
| 2,543,252 | 2/1951 | Nabstedt et al. . |

(List continued on next page.)

FOREIGN PATENT DOCUMENTS

| | | |
|---|---|---|
| 1480262 | 3/1969 | Fed. Rep. of Germany ... 192/91 A |
| 765330 | 6/1934 | France ................... 192/91 A |
| 1027925 | 4/1966 | United Kingdom . |
| 1373479 | 11/1974 | United Kingdom . |
| 2006377A | 5/1979 | United Kingdom . |
| 2088010A | 6/1982 | United Kingdom . |
| 2112490A | 7/1983 | United Kingdom . |
| 2121504A | 12/1983 | United Kingdom . |

OTHER PUBLICATIONS

Drawing of fluid clutch unit for Saab vehicle.
Drawing of booster type clutch actuating unit.

*Primary Examiner*—Rodney H. Bonck
*Attorney, Agent, or Firm*—Robert F. Hess; Lawrence J. Shurupoff

[57] ABSTRACT

A system for actuating a clutch by axial movement of an actuating member which is rotatable about a clutch axis with the axial movement for actuating occurring via engagement of the actuating member with a clutch release bearing, the system including a fluid actuated clutch release bearing assembly actuable along a central axis which is generally in line with the clutch axis, and with the clutch release bearing assembly including alignment means separate from the clutch release bearing for moving the axis of rotation of the clutch release bearing substantially into alignment with the clutch axis and with the clutch release bearing assembly including a housing member having an annular, axially extending cylinder portion having a cylinder cavity adapted to receive a piston for reciprocation therein, and with the system including a seal located in the cylinder cavity and operative with the piston to hold the inner end of the piston in a radially spaced relationship with the confronting walls of the cylinder cavity.

1 Claim, 17 Drawing Figures

U.S. PATENT DOCUMENTS

| | | |
|---|---|---|
| 2,575,765 | 11/1951 | Nabstedt et al. . |
| 2,584,926 | 2/1952 | Roll . |
| 2,593,192 | 4/1952 | Rockwell . |
| 2,612,420 | 9/1952 | Reynolds . |
| 2,688,610 | 2/1954 | Backus . |
| 2,717,680 | 9/1955 | Smith . |
| 2,727,471 | 12/1955 | Martin . |
| 2,757,769 | 8/1956 | Roise . |
| 2,777,741 | 1/1957 | ViElmo . |
| 2,814,540 | 11/1957 | Southerwick . |
| 2,864,480 | 12/1958 | Sink . |
| 2,865,481 | 12/1958 | Giri de Teramala . |
| 2,873,834 | 2/1959 | Kepner . |
| 2,885,049 | 5/1959 | Staadt . |
| 2,893,519 | 7/1959 | Martin ................................ 92/107 |
| 2,895,773 | 7/1959 | McConnaughey . |
| 2,901,066 | 8/1959 | Garmager . |
| 2,909,398 | 10/1959 | Taylor . |
| 2,916,936 | 12/1959 | Neracher et al. . |
| 2,967,396 | 1/1961 | Staadt . |
| 2,973,231 | 2/1961 | Reynolds . |
| 3,004,438 | 10/1961 | Funk et al. ................ 192/85 CA X |
| 3,016,121 | 1/1962 | Mosbacher . |
| 3,083,588 | 4/1963 | Christenson . |
| 3,131,796 | 5/1964 | Youngs, III . |
| 3,145,816 | 8/1964 | De Lorean et al. . |
| 3,166,165 | 1/1965 | Anderson et al. . |
| 3,203,187 | 8/1965 | Randol . |
| 3,321,055 | 5/1967 | Randol . |
| 3,333,665 | 8/1967 | Einchcomb et al. . |
| 3,399,647 | 9/1968 | Alexander, Jr. et al. . |
| 3,433,340 | 3/1969 | Murakami . |
| 3,461,993 | 8/1969 | Brundage . |
| 3,468,405 | 9/1969 | Gardner et al. . |
| 3,531,132 | 9/1970 | Lissau . |
| 3,548,989 | 12/1970 | Root . |
| 3,687,253 | 8/1972 | Bjorklund . |
| 3,786,903 | 1/1974 | Haga et al. . |
| 3,832,141 | 8/1974 | Haldopoulos . |
| 3,848,518 | 11/1974 | Martin . |
| 3,874,382 | 4/1975 | Nogier et al. . |
| 3,892,302 | 7/1975 | Rist . |
| 3,893,549 | 7/1975 | Bennett . |
| 3,907,085 | 9/1975 | Rist . |
| 3,910,131 | 10/1975 | Richards . |
| 3,912,058 | 10/1975 | Parkins . |
| 3,955,660 | 5/1976 | Poon et al. . |
| 3,965,699 | 6/1976 | Bracken ................... 308/184 R X |
| 3,969,950 | 7/1976 | Rau et al. . |
| 3,970,321 | 7/1976 | Dechavanne . |
| 3,974,901 | 8/1976 | Cervinka et al. . |
| 3,975,986 | 8/1976 | Barth et al. . |
| 4,044,871 | 8/1977 | Kiener . |
| 4,051,937 | 10/1977 | Garrett et al. . |
| 4,067,425 | 1/1978 | Soter . |
| 4,069,904 | 1/1978 | Garrett et al. . |
| 4,083,443 | 4/1978 | Hamada et al. . |
| 4,089,533 | 5/1978 | Knudson . |
| 4,114,743 | 9/1978 | Sink et al. . |
| 4,243,130 | 1/1981 | Vinel ................................. 192/90 |
| 4,258,614 | 3/1981 | Aono . |
| 4,351,427 | 9/1982 | Miyahara ........................ 192/98 |
| 4,352,419 | 10/1982 | Olschewski et al. ............ 192/98 |

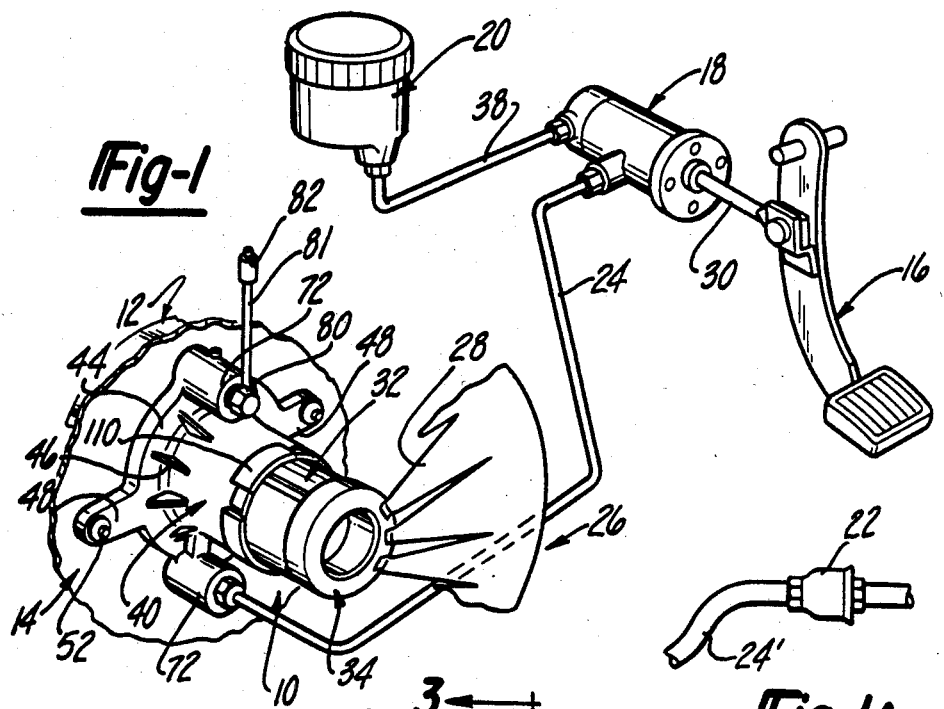
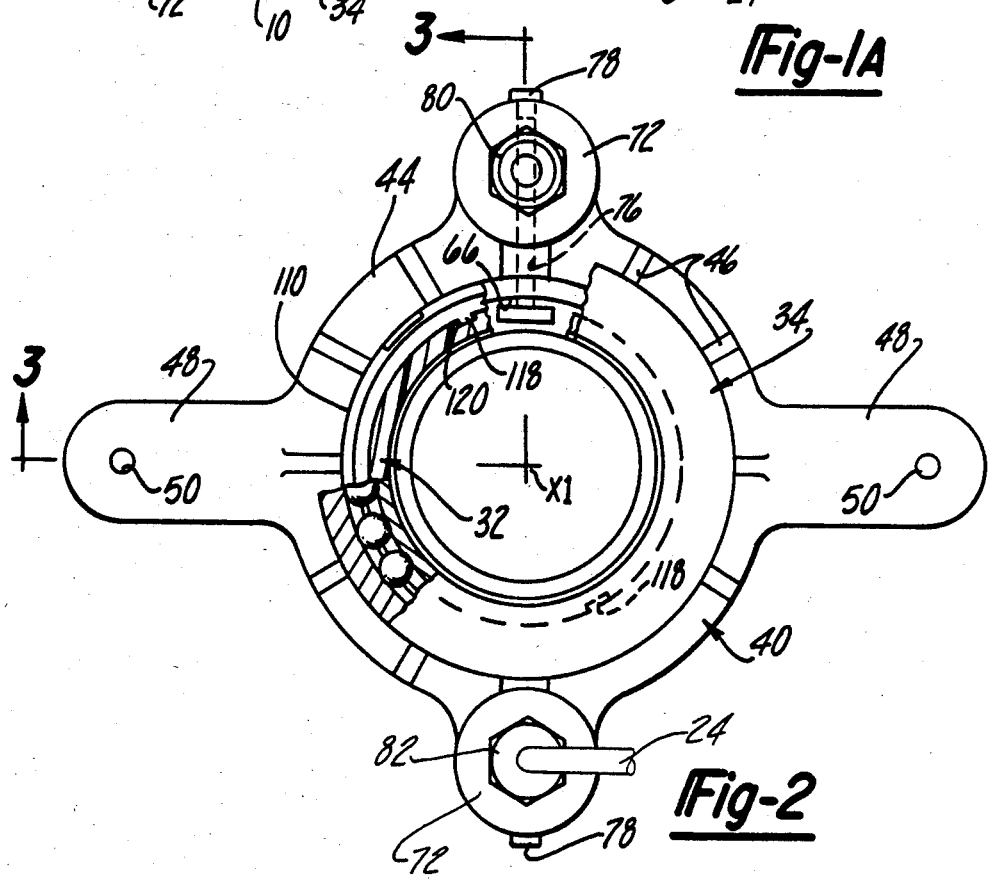

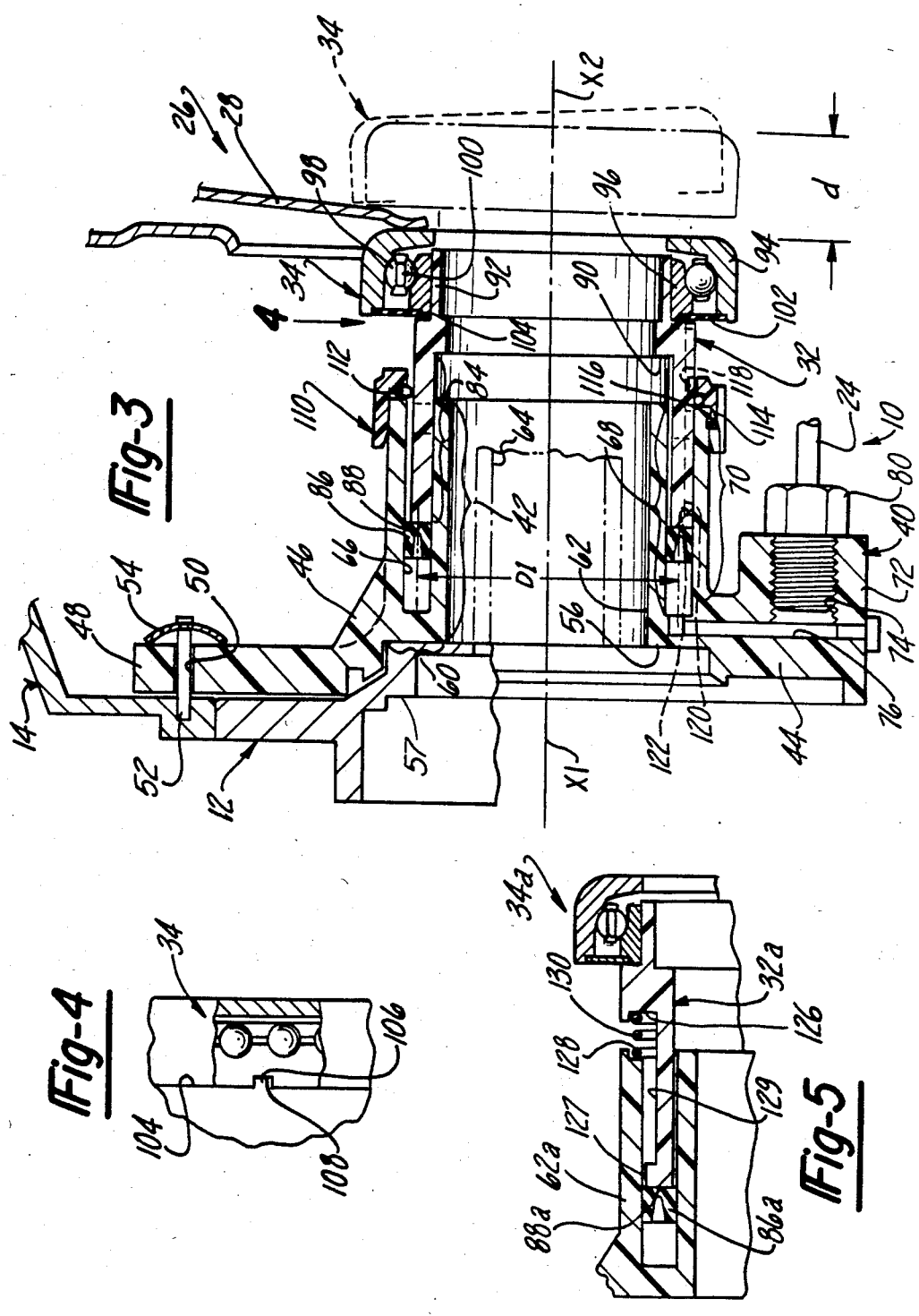

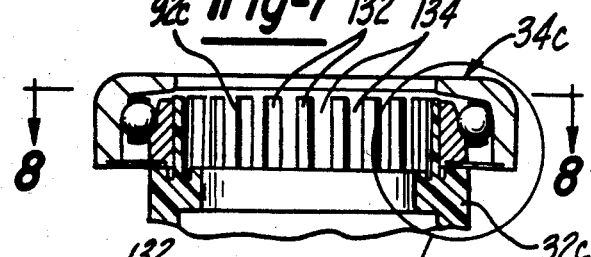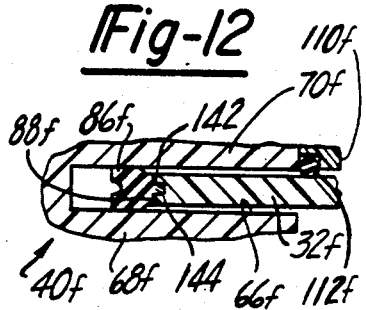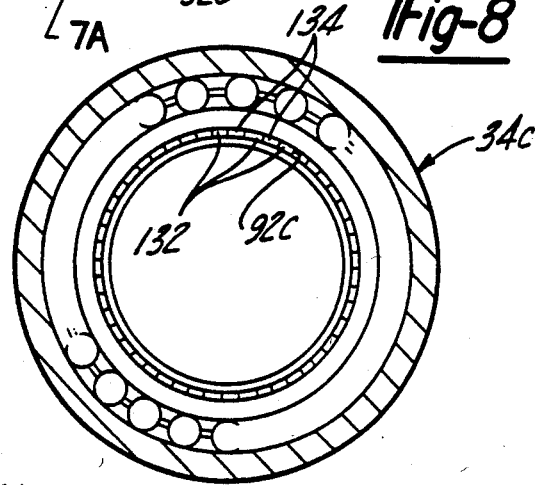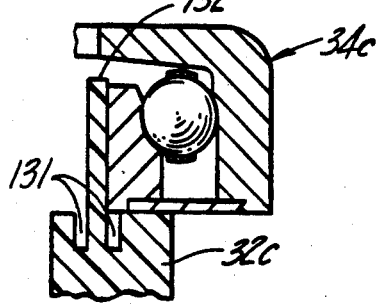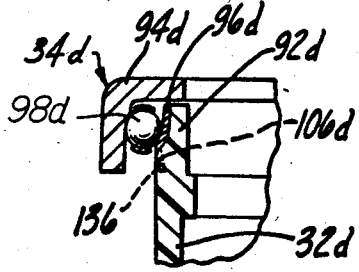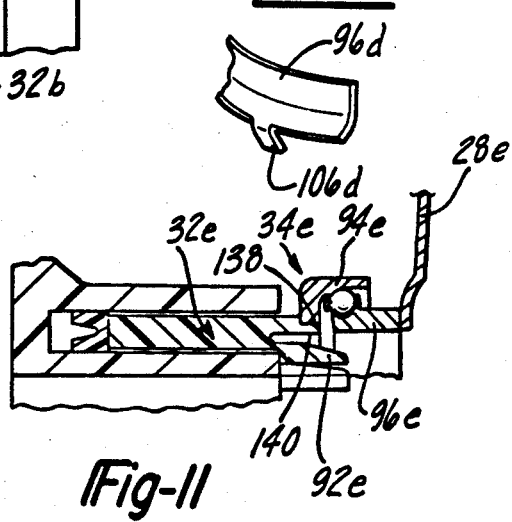

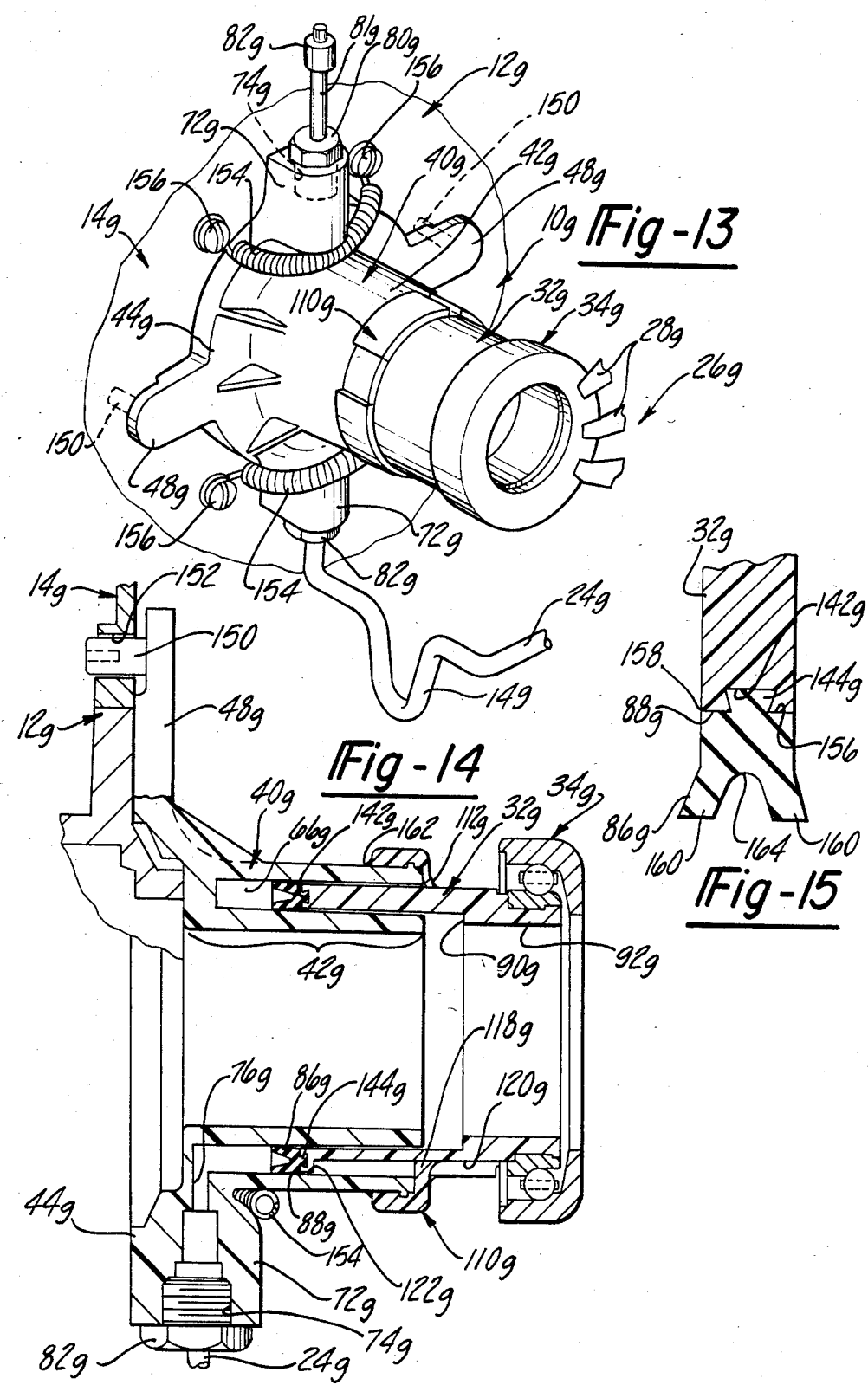

HYDRAULIC CLUTCH PISTON AND SEAL

RELATED APPLICATIONS

The present invention is a continuation-in-part of the co-pending patent application Ser. No. 06/370710, filed Apr. 22, 1982 for improvements in Fluid Actuated Clutch Assembly.

SUMMARY BACKGROUND OF THE INVENTION

The present invention relates to mechanisms for actuating clutch release bearings and more particularly relates to a fluid actuated clutch release bearing assembly including a fluid actuating device which is substantially coaxial with the axis of the associated clutch release bearing with the device including a tubular piston supported at one end by an annular seal.

It has been conventional to actuate clutch release bearings solely through mechanical linkages and in certain systems a hydraulic cylinder has been used with certain of such mechanical linkages. With the latter construction, however, the basic problems attendant with the conventional linkages are not eliminated. At least some of the latter problems result from off-center loads applied to the bearing during actuation. The linkage problems have been eliminated by systems utilizing an actuator cylinder which is generally coaxial with the axis of the associated clutch release bearing and hence coaxial with the axis of the associated clutch.

In the apparatus of the present invention the release bearing is supported in such a way by its associated apparatus that it has a self-aligning feature, i.e. the axis of the bearing can automatically be brought into alignment with the clutch axis. This provides self-alignment while permitting the use of a less expensive bearing of a more conventional, non-self-aligning construction.

In one form of the invention the bearing is actuated by a tubular piston which is reciprocably mounted within an annular cylinder; and annular seal is connected to and supports the inner end of the piston and is movable with the piston and holds the supported piston end from engagement with the cylinder walls whereby scoring is inhibited.

In addition the apparatus of the present invention is of such a design whereby certain components can be made by manufacturing techniques which can result in an overall construction which is lighter in weight and is less costly.

Therefore, it is a general object of the present invention to provide an improved fluid actuated clutch release bearing assembly which includes a fluid actuating device which is substantially coaxial with the axis of the associated clutch release bearing.

It is another object of the present invention to provide a clutch release bearing assembly of the above noted type having self-aligning features permitting the use of a non-self-aligning bearing.

It is another object of the present invention to provide a clutch release bearing assembly of the above noted type which is of a design permitting manufacture by techniques which can result in a less costly construction.

It is still another object of the present invention to provide a clutch release bearing of the above noted type in which a reciprocable, tubular piston is reciprocably supported in an annular cylinder by an annular seal.

Other objects, features, and advantages of the present invention will become apparent from the subsequent description and the appended claims, taken in conjunction with the accompanying drawings, in which:

FIG. 1 is a pictorial view with some parts broken away showing a clutch system including the fluid actuated clutch release bearing assembly of the present invention;

FIG. 1A is a fragmentary view of a portion of the clutch system of FIG. 1 with the addition of a double acting check valve to assist in maintaining residual pressure;

FIG. 2 is a front elevational view (to enlarge scale) of the clutch release bearing assembly of FIG. 1 with some parts broken away and others shown in section;

FIG. 3 is a sectional view (with some parts broken away) of the release assembly of FIG. 1 taken generally along the lines 3—3 of FIG. 2 and showing the release assembly in engagement with clutch actuating fingers in one position and showing different engaged positions in phantom;

FIG. 4 is an elevational view, with some parts broken away and others in section, taken generally in the direction of the arrow 4 in FIG. 3;

FIG. 5 is a fragmentary view showing a modified form of the release assembly of FIGS. 1-4 with the addition of a spring member biased for maintaining continuous contact of the release bearing with the clutch actuating fingers;

FIG. 6 is a fragmentary, sectional view showing a modified form of the release assembly of FIGS. 1-4 with the addition of a spring member biased for returning the release bearing to its deactuated position;

FIG. 7 is a fragmentary view with some parts shown in section of a flexible bearing support ring for providing additional alignment capability for the release bearing;

FIG. 7A is an enlarged, fragmentary sectional view of a portion of the support ring of FIG. 7 generally shown in the area designated by the numeral 7A in FIG. 7;

FIG. 8 is a sectional view of the apparatus of FIG. 7 taken generally along the lines 8—8 of FIG. 7;

FIG. 9 is a fragmentary sectional view of a modified release bearing and support structure, with the bearing having a thin walled inner race, for use with the clutch release bearing assembly of FIGS. 1-4;

FIG. 10 is an enlarged fragmentary view of a portion of the inner race of FIG. 9 depicting an anti-rotation structure;

FIG. 11 is a framentary, sectional view depicting a modified clutch release bearing adapted to actuate the associated clutch fingers by inner race engagement;

FIG. 12 is a fragmentary, sectional view of a modified piston and seal for a fluid actuated clutch release bearing assembly;

FIG. 13 is a pictorial view similar to FIG. 1 depicting another form of fluid actuated clutch release bearing;

FIG. 14 is a sectional view (with some parts broken away) of the release assembly of FIG. 13 with a section taken similarly to that of FIG. 3; and FIG. 15 is a fragmentary view to enlarged scale depicting the seal and piston construction of FIG. 13 in a position out of assembly with the associated cylinder.

Looking now to FIG. 1 a fluid actuated clutch release bearing assembly 10 is shown assembled to a transmission casing 12 via an associated bell housing (or clutch cover) 14. The clutch release assembly 10 is a part of clutch release system which includes a clutch pedal 16 and a master cylinder 18 in a fluid line 24. The release assembly 10 is operable to actuate a clutch 26 via engagement with clutch release fingers 28. The clutch release fingers 28 have a spring characteristic similar to that of a Belleville washer. Since clutch 26 is of a conventional structure only a portion has been shown for simplicity.

In operation, the pedal 16 is depressed actuating the master cylinder 18 via a connecting rod assembly 30. Fluid under pressure is transmitted to the clutch release assembly 10 via the fluid line 24. A piston 32 of the release assembly 10 responds to the fluid pressure and is moved outwardly and actuates the clutch 26 via engagement of a clutch release bearing 34 with the clutch release fingers 28. When the pedal 16 is released, the spring load of fingers 28 will urge the piston 32 towards its original position whereby the fluid will be returned to the master cylinder 18 through line 24; this in turn will cause pedal 16 to be returned. In this deactuated condition, the release bearing 34 may be in light engagement with the release fingers 28.

In some cases it may be desirable to assure that the release bearing 34 is in constant engagement with the actuating fingers 28 under a preselected load. This can be accomplished with the use of a double acting check valve. Such an arrangement is shown in the fragmentary view of FIG. 1A where components similar to like components in FIG. 3 are given the same numerical designation with the addition of a prime. Thus in FIG. 1A a double acting check valve 22 is located in fluid line 24' or alternatively in the aassociated master cylinder (element 18 in FIG. 3, not shown in FIG. 1A). Thus, check valve 22 can open relatively freely when the master cylinder (18) is actuated to transmit fluid to release assembly (10) but is set to close at a higher but still relatively low pressure when fluid is returned to the master cylinder (18) upon deactuation of the clutch. This will result in the maintenance of a residual pressure at the release assembly (10) after the clutch pedal 16 has been released. Thus the piston (32) will maintain the release bearing (34) in light engagement with the clutch actuating fingers (28).

A fluid reservoir 20 operates in a conventional manner to provide a supply of fluid to master cylinder 18 via fluid line 38. The master cylinder 18 and reservoir 20 can be of a construction similar to those well known for hydraulic brake applications and hence the details thereof have been omitted for simplicity.

Looking now to FIGS. 1-3, the clutch release assembly 10 includes a housing 40. Housing 40 has a generally tubular cylinder portion 42 connected with an enlarged mounting flange portion 44. A plurality of circumferentially spaced reinforcing ribs 46 are located in the transition between the flange portion 44 and the cylinder portion 42. The flange portion 44 has a pair of radially extending, diametrically opposed mounting arms 48 each of which includes a through opening 50. A pair of mounting pins 52 are supported in the face of the bell housing 14 and are adapted to extend through openings 50 in a radially clearance relationship. The housing 40 (and hence release assembly 10) is held to the bell housing 14 via spring clips 54 which are secured via engagement with slots in pins 52. The spring clips 54 hold the release assembly 10 in place under a light, resilient clamp force such that, within the confines of the clearance between the pins 52 and associated openings 50, the housing 40 (and hence the release assembly 10) is free to move radially. As will be seen this freedom of radial movement enhances the utility of the release assembly 10 to locate the rotational axis X1 of bearing 34 into alignment with the axis X2 of the clutch 26. To this end, the housing 40 has a stepped counterbore 56 which is of a configuration which generally follows that of an end cap 57 which is supported as a part of the transmission casing 12. Note, however, that the counterbore 56 provides a slight radial clearance with the radially confronting portions of the end cap 57 such that the desired radial movement noted above can be accommodated. It should also be noted that the axial engagement between the housing 40 and transmission casing 12 occurs between a portion of the innermost surface of counterbore 56 and a portion of the outermost surface of the cap 57; this limited annular contact area has been designated by the bracket 60. At the same time a slight axial clearance has been provided between the remainder of the flange portion 44 (including arms 48) and the confronting surface portions of the bell housing 14 and end cap 57. The limited, and controlled contact area is selected to minimize friction and resistance to radial movement whereby axial alignment between bearing 34 and clutch 26 can be more readily accomplished and to minimize structural deflection of housing 40 during actuation of assembly 10.

The housing 40 has a reduced diameter through bore 62 which communicates with counterbore 56. In conventional mechanically actuated systems, an axially extending tubular housing portion (or quill) 64 (shown in phantom) extends through the bore 62. The quill 64 (only partially shown) generally shields that portion of the transmission shaft interconnecting the transmission with the clutch. The outer surface of the quill 64 is machined to slidingly support an associated clutch release bearing. In the present invention, the quill 64 is eliminated resulting in a savings.

The cylinder portion 42 of housing 40 includes an annular cylinder cavity 66 defined by radially spaced inner and outer, annular cylinder portions 68 and 70, respectively. The portions 68 and 70 extend generally coextensively, axially outwardly.

The flange portion 44 has a pair of diametrically opposed bosses 72 located in quadrature relative to the mounting arms 48. Each boss 72 has an axially extending threaded bore 74 which communicates with a radially extending cross bore 76 which in turn communicates with cylinder cavity 66. The radially outer ends of cross bores 76 are plugged via sealing plugs 78. One of the threaded bores 74 receives a fluid fitting 82 connected to the end of fluid line 24 while the other of the bores 74 receives, via plug 80, a bleed line 81 capped with a threadably removable plug 82. Plug 82 can be used for bleeding air from the cylinder cavity 66 and the connecting fluid passages during initial charging of the system.

Piston 32 is of a tubular construction and has an annular piston portion 84 adapted to be received within the annular cylinder cavity 66 for reciprocable movement. The piston portion 84 is provided to have a preselected radial clearance relative to cylinder cavity 66 at both its radially inner and outer surfaces. This permits a selected, limited radial movement whereby co-axial alignment of the axis X1 of bearing 34 with clutch axis X2 is additionally facilitated. In one form of the invention where the mean diameter D1 of the piston portion 84 and cylinder cavity 66 was 1.85 inches a total radial clearance of 0.062 inches was provided. By contrast, it should be noted that the sliding clearance for a conventionally constructed piston and cylinder of the same general size would be approximately 0.006 inches. With the present invention, the radial clearance to provide the desired radial movement should be greater than around 0.010 inches. At the same time excessive radial clearance would not be desirable.

As noted any misalignment between the axes can be accommodated by self-aligning bearings. The maximum misalignment that is normally accommodated in this manner is from around 0.015 inches to around 0.030 inches. The above described structure of the present invention provides such a range of self-alignment while permitting the use of a conventional bearing.

An annular seal 86, of a suitable elastomeric and/or resilient material, is locaed in cylinder cavity 66 and is engageable with the innermost surface 88 of piston portion 85. The area of surface 88 is maintained proximate to that of the confronting area of the seal 86 to inhibit extrusion of the seal 86 into any gap between the piston portion 84 and the side walls of cylinder cavity 66 caused by the desired clearance. If necessary the piston portion 84 can be readily stepped for a short axial distance such that the area at the end surface 88 is greater than the area of the piston portion after the step whereby seal extrusion will be prevented but radial movement of the piston 32 can still be accommodated. Such a stepped construction is shown in FIG. 5 and will be described in conjunction with that embodiment.

As can be seen in FIG. 3 the radial clearance not only permits movement radially but also permits a limited amount of angulation of the axis of piston 32. As the piston 32 moves outwardly the amount of possible angulation increases. Note that the axial movement and angulation of the piston 32 can occur because the end of piston 32 extending out from the cylinder cavity 66 is unsupported and is free to move radially to seek the proper co-axial alignment.

A radially inwardly extending stop shoulder 90 is located a preselected distance from the inner end of piston 32 to stop the inward most movement of piston 32 whereby the seal 86 will not be moved against the back wall of cylinder cavity 66 by return movement of piston 32. The outer end of piston 32 terminates in a reduced section, annular support ring 92. The ring 92 is of an outside diameter to snugly receive and support the bearing 34. The bearing 34 is a ball bearing assembly of an angular contact type and includes an outer race 94, an inner race 96, and a plurality of ball members 98 circumferentially spaced by a cage 100; an annular seal 102 is located between the outer race 94 and the inner race 96. The inside diameter of inner race 96 and the outside diameter of the support ring 92 are selected to provide a slight interference fit whereby the bearing 34 will be securely, axially held to the end of piston 32. An annular shoulder 104 is defined by the juncture of the support ring 92 and the adjacent portion of the piston 32. When assembled, the inner race 96 engages the shoulder 104 whereby axial loads on the bearing 34 are transmitted to the piston 32. It can be seen that the support ring 92 and the adjacent portion of the piston 32 are unsupported by the cylinder portion 42 over the travel of the piston 32 thus facilitating the radial movement and angulation for providing the desired co-axial alignment previously discussed. While an angular contact type bearing is shown, a suitable thrust type bearing could be used especially in view of the self-alignment feature.

In the embodiment of FIGS. 1-4, the bearing 34 is adapted for outer race rotation. It is desirable to assure that the inner race does not rotate. Thus in order to prevent relative rotation between the inner race 96 of bearing 34 and the piston 32, the inner race 96 is provided with an axially extending slot 106 adapted to receive a tab 108 located in shoulder 104 of piston 32 (see FIG. 4).

A dust cap 110 is located over the outer end of the cylinder portion 42 and holds an annular resilient dust seal 112 which is adapted to seal against the radially outer surface of piston 32 as it is reciprocated. The seal 112 (FIG. 3) is dimensioned to accommodate the radial movement of the piston 32. The cap 110 is axially held in place by a plurality of circumferentially disposed flexible fingers 114 which are locatable in a similar plurality of notches 116 in the outer surface of the cylinder portion 42. Thus this latter engagement also holds the dust cap 110 from rotation relative to the cylinder portion 42.

The dust cap 110 also has a pair of diametrically opposed, radially inwardly extending tabs 118 which are locatable within axially extending slots 120 in the outer surface of the piston 32 (see FIGS. 2 and 3). This engagement prevents relative rotation between the piston 32 and the housing 40. Thus the inner ring 96 of bearing 34 will be positively held from rotation by virtue of the engagement of inner race slot 106 with tab 108 in piston shoulder 104, the engagement of dust cap tabs 118 with piston slots 120, and the engagement of dust cap fingers 114 in cylinder portion notches 116. The seal 112 can be provided to engage the piston 32 and the cap 110 with a sufficient frictional force to essentially inhibit rotation of the piston 32 whereby the need for the above noted anti-rotational construction could be obviated.

While the axial slots 120 extend through the outer end of piston 32 they terminate in shoulders 122 at the inner end. The shoulders 122 are adapted to engage dust cap tabs 118 whereby movement of the piston 32 completely out from the cylinder cavity 66 will be precluded. It should be noted that with the piston 32 in its innermost (retracted) position, the shoulder 90 will locate the bearing 34 away from the outer axial end of dust cap 110.

Looking now to FIG. 3 the release bearing assembly 10 is shown (in solid lines) in a position where the outer race 94 is in light engagement with clutch actuating fingers 28. When the clutch pedal 16 (FIG. 1) is depressed the pressure in cylinder cavity 66 is increased moving the piston 32 axially outwardly to overcome the spring force of clutch fingers 28 whereby the clutch 26 will be actuated to its disengaged condition. If the axis of rotation of the outer race 94 is not in alignment with that of the clutch fingers 28 a radial force will be exerted on the outer race 94 urging it towards alignment. The structure of the present invention will permit movement towards such alignment. Thus the ability of the housing 10 to move radially and the ability of the piston 32 to move radially and to angulate each independently and together assists in permitting self-alignment of the bearing 34. Such self-alignment movement is shown in phantom in FIG. 3. Thus with such a structure a conventional bearing can be utilized in lieu of a bearing having a specific self-alignment construction. An example of such a self-alignment bearing is shown in U.S. Pat. No. 4,276,974, issued July 7, 1981, for Self-Aligning Clutch Release Bearing to Eli Ladin. It should be understood that the release bearing assembly 10 could be used with a self-aligning bearing, which would result in still greater overall self-alignment capability.

In some constructions it may be desirable (to prevent chatter for example) to mechanically assist the axial force provided hydraulically for continuous engagement between the bearing 34 and the clutch fingers 28. Such a construction is shown in FIG. 5. In the embodiment of FIG. 5 components similar to like components in the embodiment of FIGS. 1–4 are given the same numerical designation with the addition of the letter postscript "a".

Thus in FIG. 5, the piston 32a and the end of cylinder portion 62a are provided with confronting annular recesses 126 and 128, respectively, which receive opposite ends of a coil spring 130. The spring 130 is preloaded to urge the piston 32a outwardly whereby the bearing 34a will be urged into engagement with the clutch fingers 28a with a preselected axial force for continuous engagement. Of course, the magnitude of the total axial force for such continuous engagement (prior to clutch actuation) would not be sufficient to actuate the clutch. In the construction of FIG. 5 the piston 32a is provided with an enlarged flange like portion 127 and a reduced diameter body portion 129. With this construction an adequate area of contact is provided by surface 88a for engagement with seal 86a whereby extrusion under pressure is inhibited. The radially outer surface of portion 127 is slightly curved. Thus the piston 32a can still angulate for self adjustment purposes.

In some applications it may be desirable to provide that the bearing be held out of engagement with the clutch fingers during non-actuation of the clutch. Such a structure is shown in FIG. 6 where components similar to like components in the embodiments of FIGS 1–4 and 5 are given the same numerical designation with the addition of the letter postscript "b".

Thus in FIG. 6, the piston 32b and end of cylinder portion 62b are provided with annular ridges 126b and 128b, respectively, which receive opposite ends of a coil spring 130b. The spring 130b is preloaded to urge the piston 32b inwardly whereby the bearing 34b will be moved out of engagement with the clutch fingers 28b when the clutch is deactuated. This preload will be operative to provide a positive pressure in cylinder 66b and hence to assist in maintaining fluid pressure on the seal 88b whereby cavitation and fluid leakage can be inhibited.

As noted for purposes of self-alignment, it may be desirable that the bearing support ring 92 (FIGS. 1–4) be flexible. In FIGS. 7, 7A and 8 a structure is shown in which such flexibility is provided; in the embodiment of FIGS. 7, 7A and 8 components similar to like components in the embodiment of FIGS. 1–4 are given the same numerical designation with the addition of the letter postscript "c".

Thus in FIGS. 7 and 8 the piston 32c has a bearing support ring 92c with a plurality of axially extending fingers 132; the fingers 132 are separated by slots 134 whereby a flexible support for bearing 34c is provided to further enhance the alignment capability of the bearing 34c. Note that the fingers 132 are radially notched via axially extending notches 131 (see FIGS. 7 and 7A) whereby their flexibility is enhanced.

Because the loading on the release bearing is mainly axial, i.e., since the radial side loads attendant with mechanically actuated systems have been essentially eliminated, it is possible to utilize a thin walled inner race. Such a construction is shown in FIGS. 9 and 10. In FIGS. 9 and 10 components similar to like components in the embodiment of FIGS. 1–4 are given the same numerical designation with the addition of the letter postscript "d".

Thus in FIG. 9, the piston 32d has a bearing support ring 92d which is of a greater wall thickness than that shown in the other embodiments of FIGS. 1–8. The bearing 34d while having a conventional outer race 94d is provided with a thin walled inner race 96d. In one form the thin walled race could be of a thickness of from around 0.060 inches to around 0.100 inches. With such a wall thickness, the inner race 96d could lend itself to fabrication by stamping hence providing for an inexpensive structure. By contrast the more conventionally formed inner race 96 of FIGS. 1–4 would be around 0.250 inches thick. Since the radially inner surface of the inner race 96d will conform to the arcuate shape of its radially outer surface defining the raceway for the ball member 98d, the seat provided by the engaging surface of support ring 92d is similarly contoured. Preferably the support ring 92d will receive the inner race 96d with a slight press fit. Anti-rotation is provided by tabs 106d, shown also in FIG. 10 which after installation can be bent over into retaining slots 136 in the piston 32d. Thus in the latter construction an inexpensive bearing construction is used.

In some structures it is advantageous to provide engagement with the clutch fingers by the inner race and to hold the outer race from rotation. Such a structure is shown in FIG. 11 where components similar to like components in the embodiment of FIGS. 1–4 are given the same numerical designation with the addition of the letter postscript "e".

Thus in FIG. 11, the bearing 34e has an inner race 96e adapted to engage the clutch actuating fingers 28e. The outer race 94e is supported on the support ring 92e and is fixed from rotation by axially extending ridges 138 on piston 32e engaging slots 140 in outer race 94e.

It may be desirable to support the inner end of the piston radially spaced from the confronting side walls of the associated cylinder cavity. Such a structure is shown in FIG. 12 where components similar to like components in the embodiment of FIGS. 1–4 are given the same numerical designation with the addition of the letter postscript "f".

In FIG. 12 piston 32f (partially shown) has an annular, circular groove 142 formed in its end surface 88f. The annular seal 86f has an annular ring portion 144 adapted to be matingly received within the groove 142. The ring portion 144 is generally radially centrally located between the radially inner and outer surfaces of the seal 86f. In this way the end 88f of the piston 32f will be radially held generally in the center of the cylinder cavity 66f and will be spaced from the radially confronting walls of cylinder portions 68f and 70f. Note that the connection between seal 86f and piston 32f is resilient permitting radial and pivotal movement of piston 32f. Thus while the piston 32f can move relative to housing 40f to provide the self-alignment previously discussed its inner end 88f will be held resiliently away from the cylinder walls thereby inhibiting scoring of the cylinder walls as the piston 32f is reciprocated within the cylinder cavity 66f. Scoring of the cylinder walls could result in leakage of fluid past seal 86f. Thus the construction of FIG. 12, by minimizing and/or precluding engagement of the end 88f with the cylinder walls, inhibits scoring and enhances sealing. While a ring (144) and groove (142) arrangement is shown, other constructions could be utilized to hold the end 88f of the piston 32f spaced from the cylinder walls during reciprocation whereby engagement is prevented. Cap 110f (partially shown) and seal 112f are not discussed but perform the same functions as their similarly numbered counterparts in FIGS. 1-4. It should be noted that seal 112f generally resiliently, radially supports the outer end of piston 32f while permitting radial movement thereof.

A modified release bearing assembly having a piston and seal construction similar to that shown in FIG. 12 is depicted in FIGS. 13-15 where components similar to like components in the previous embodiments are given the same numerical designation with the addition of the letter postscript "g".

Looking now to FIG. 13 a fluid actuated clutch release bearing assembly 10g is shown assembled to a transmission casing 12g via an associated bell housing (or clutch cover) 14g. The clutch release assembly 10g is a part of the clutch release system and is operable to actuate clutch 26g.

Looking now to FIGS. 13-14, the housing 40g of clutch release assembly 10g has a generally tubular cylinder portion 42g connected with an enlarged mounting flange portion 44g. A pair of radially extending, diametrically opposed mounting arms 48g have pin portions 150 which are adapted to be located in clearance relationship in locating bores 152 in the face of the bell housing 14g. The bores 152 serve to generally locate the assembly 10g such that its axis is generally aligned with the axis of clutch 26g. Of course the self alignment features of assembly 10g permit a more accurate final alignment to occur. The housing 40g (and hence release assembly 10g) can be held to the bell housing 14g via springs 154 which are secured at opposite ends to bell housing 14g via fasteners 156. The springs 154 hold the release assembly 10g under a light, resilient clamp force such that, within the confines of the clearance between the pin portions 150 and associated openings 152, the housing 40g (and hence the release assembly 10g) is free to move radially. Note that where the assembly 10g is of a type where bearing 34g is held in constant engagement with clutch fingers 28g the springs 154 may be omitted.

The cylinder portion 42g of housing 40g includes an annular cylinder cavity 66g. The flange portion 44g has a pair of diametrically opposed bosses 72g located in quadrature relative to the mounting arms 48g. Each boss 72g has a radially extending threaded bore 74g which is in alignment and communicates with a radially extending cross bore 76g which in turn communicates with cylinder cavity 66g. One of the threaded bores 74g receives a fluid fitting 82g connected to a source of pressure via fluid line 24g while the other of the bores 74g receives via fitting 80g a bleed line 81g capped with a threadably removable plug 82g. Plug 82g is located at the vertically uppermost portion of the fluid passages in assembly 10g and provides a means for bleeding air from the cylinder cavity 66g and the connecting fluid passages during initial charging of the system. The fluid line 24g is provided with a U-shaped trap 149 generally located vertically below the lowermost portion of the fluid system of assembly 10g. The trap acts to collect particles that may inadvertently get into the fluid system and in this way protects the cylinder walls from scoring and the seal from being unseated which could cause fluid leakage. The trap 149 when located proximate to the bearing assembly 10g also provides flexibility to the system such that installation and alignment are enhanced. Note that while a U-shaped trap is shown other constructions defining a trap, i.e. one or more helical loops, could be used.

The tubular piston 32g is adapted to be reciprocably received within the annular cylinder cavity 66g with a preselected radial clearance.

An annular seal 86g, of a suitable elastomeric and/or resilient material, is connected at the innermost surface 88g of piston 32g. Thus piston 32g has an annular, circular groove 142g formed in its end surface 88g. The annular seal 86g has an annular ring portion 144g adapted to be matingly received within the groove 142g. The groove 142g and seal ring portion 144g are shaped to define a dovetail configuration such that upon assembly the seal 86g and piston 32g are locked together. While a dovetail lock is shown other configurations could be used. The ring portion 144g is generally radially centrally located between the radially inner and outer surfaces of the seal 86g.

Looking now to FIG. 15, the seal 86g and piston 32g are shown out of assembly with the cylinder cavity 66g. Note that the end surface 88g and the end surface 156 of seal 86g are substantially radially coextensive. It is believed desirable that the radially inner and outer extremities of seal end surface 156 be generally equal to or greater than the corresponding radial extremities of the piston end surface 88g. This annular cross-sectional conformation is generally maintained for the body portion 158 of seal 86g up to a pair of annular sealing lips 160 which are flared radially away from a central, annular groove 164. Thus the body portion 158 will be generally in clearance relationship (along with piston 32g) with the walls of cylinder cavity 66g while the annular lips 160 have a preselected interference to provide the necessary sealing engagement. In this way the piston end surface 88g will be radially held generally in the center of the cylinder cavity 66g and will be spaced from its radially confronting cylinder walls. The latter inhibits scoring of the cylinder walls as the piston 32g is reciprocated within the cylinder cavity 66g. Another advantage is securing the seal 86g to the piston 32g is that the tendency for rolling, which could occur with a separately mounted seal, is also inhibited. In one form of the invention the seal 86g was constructed of a flexibile ethylene, propylene compound having a Shore Hardness of A80.

Note that the dovetail connection at the intersection of the seal end surface 156 and piston end surface 88g is relatively small in cross-section and hence defines a relatively flexible connection. This flexible connection permits limited relative movement between the piston 32g and the seal body portion 158 whereby such movement can be accommodated with the sealing engagement of sealing lips 160 substantially maintained. In some applications, however, it may be desirable to strengthen the mechanical connection by the use of a suitable adhesive at that intersection, i.e. end surfaces 156 and 88g.

A radially inwardly extending stop shoulder 90g is located a preselected distance from the inner end of piston 32g to stop the inward most movement of piston 32g. The outer end of piston 32g terminates in a reduced section, annular support ring portion 92g which is of an outside diameter to snugly receive and support bearing 34g.

A dust cap 110g is located over the outer end of the cylinder portion 42g and has integrally formed therewith an annular resilient dust seal lip 112g which is adapted to seal against the radially outer surface of piston 32g as it is reciprocated. The seal lip 112g is dimensioned to accommodate the radial movement of the piston 32g. The cap 110g is axially fixed in place by welding (as at 162) or by a suitable adhesive. This fixed connection precludes inadvertent dissassembly of or tampering with the piston 32g (with the possibility of the ingress of foreign particles) and also holds the dust cap 110g from rotation relative to the cylinder portion 42g.

The dust cap 110g also has a pair of diametrically opposed, radially inwardly extending tabs 118g which are locatable within axially extending slots 120g in the outer surface of the piston 32g which prevent relative rotation between the piston 32g and the housing 40g. Since the slots are not through slots, engagement of the tabs 118g with the ends 122g of slots 120g preluces the piston 32g from moving completely out of the housing 40g.

A significant advantage of the structure shown and described is its ease of fabrication. Thus the housing can be of a one piece molded plastic. In a preferred form, the material of the housing 40 was made of a molded thermoplastic material such as Zytel FE-8018; the material was glass reinforced, including approximately 13% by weight of chopped fiber glass; Zytel is a trademark of E. I. duPont de Nemores & Co., (Inc.) with the noted material being essentially a nylon resin. A similar suitably fiber reinforced material is Zytel 5105. The dust cap can also be of a one piece molded structure of the same material. The piston can be molded of a thermoplastic made of Zytel 103HS-L with the material being essentially a nylon resin. The piston is softer than the housing to inhibit wear of sealing surfaces of housing.

By thus making one or more of the above components from plastic, significant economies can be realized. In addition, by molding the housing in essentially one piece, the need for sealing between joints or providing pressure tight connections is minimized. For example, by molding the cylinder portion of one piece, the need for sealing the structural connection between the radially inner and outer cylinder portions is eliminated, i.e., if the inner cylinder portion (such as portion 68 in FIGS. 1-4) were made of a separate piece, an additional seal would be required and in addition, means would be required to assure concentricity between the inner and outer cylinder portions (such as portions 68 and 70 in FIGS. 1-4) if such a separate construction were used.

Since the plastic materials noted have good lubricity characteristics, wear is minimized. Alternatively, the housing because of its simple design can be made from a metal die casting such as aluminum. In either event the need for machining can be minimized.

Thus the above described structures provide an assembly which lends itself to self-alignment while still utilizing a conventional non self-alignment bearing. At the same time the design is of a simple construction whereby the housing can be made of a one piece molded plastic or die casting minimizing the need for seals or fluid tight joints.

While it will be apparent that the preferred embodiments of the invention discosed are well calculated to fulfill the objects above stated, it will be appreciated that the invention is susceptible to modification, variation and change without departing from the proper scope or fair meaning of the invention.

What is claimed is:

1. In a system for actuating a clutch by axial movement of an actuating member rotatable about a clutch axis via engagement with a clutch release bearing, the improvement comprising a fluid actuated clutch release bearing assembly having a central axis and being adapted to be supported with said central axis generally in line with the clutch axis, said clutch release bearing assembly including a housing member having an annular, axially extending cylinder portion having a cylinder cavity, a generally tubular piston adapted to be received in said cylinder cavity for reciprocation therein generally along said central axis in response to fluid pressure from a fluid line to said cylinder cavity, said piston having a support ring portion adapted to supportingly receive the clutch release bearing for reciprocable movement with said piston, said fluid line including a resilient trap portion located proximate to said bearing assembly for collecting solid particles to inhibit the same from entering said cylinder cavity, alignment means separate from the clutch release bearing and defining a radial clearance for permitting a preselected radial movement of at least a part of said clutch release bearing assembly in response to engagement of the clutch release bearing with the clutch actuating member whereby the axis of rotation of the clutch release bearing can be substantially moved into alignment with the clutch axis, said resilient trap portion as located proximate to said bearing assembly flexibly permitting at least some of said preselected radial movement.

* * * * *

UNITED STATES PATENT AND TRADEMARK OFFICE
CERTIFICATE OF CORRECTION

PATENT NO. : 4,601,374

DATED : July 22, 1986

INVENTOR(S) : Eli M. Ladin

It is certified that error appears in the above-identified patent and that said Letters Patent is hereby corrected as shown below:

Column 2, line 13, "enlarge" should read "enlarged".
Column 3, line 32, "aassociated" should read "associated".
Column 5, line 16, "locaed" should read "located".
Column 5, line 18, "portion 85" should read "portion 84".
Column 10, line 42, "advantage is" should read "advantage in".

Signed and Sealed this

Eleventh Day of November, 1986

Attest:

DONALD J. QUIGG

*Attesting Officer*   *Commissioner of Patents and Trademarks*